US009653993B2

(12) United States Patent
Kwon et al.

(10) Patent No.: US 9,653,993 B2
(45) Date of Patent: May 16, 2017

(54) SIGNAL CONTROL CIRCUIT AND SWITCHING APPARATUS FOR INCREASED CURRENT CONTROL

(71) Applicant: Silicon Works Co., Ltd., Yuseong-gu, Daejeon (KR)

(72) Inventors: Ok Hwan Kwon, Daejeon (KR); Baek Min Lim, Daejeon (KR); Hai Feng Jin, Daejeon (KR); Ju Pyo Hong, Daejeon (KR); Sung Hwan Kim, Daejeon (KR); Ju Hyun Lee, Daejeon (KR); Jin Won Mok, Dongducheon-si (KR); Ju Yeong Kim, Taebaeki-si (KR)

(73) Assignee: Silicon Works Co., Ltd., Yuseong-gu (KR)

( * ) Notice: Subject to any disclaimer, the term of this patent is extended or adjusted under 35 U.S.C. 154(b) by 37 days.

(21) Appl. No.: 14/717,809

(22) Filed: May 20, 2015

(65) Prior Publication Data

US 2015/0340945 A1   Nov. 26, 2015

(30) Foreign Application Priority Data

May 21, 2014  (KR) .................... 10-2014-0061009

(51) Int. Cl.
*H02M 3/156* (2006.01)
*G05F 1/44* (2006.01)
*H02M 3/335* (2006.01)

(52) U.S. Cl.
CPC .............. *H02M 3/156* (2013.01); *G05F 1/44* (2013.01); *H02M 3/33507* (2013.01)

(58) Field of Classification Search
CPC .......................... H02M 3/156–3/1588; H02M 2001/003–2001/0041
See application file for complete search history.

(56) References Cited

U.S. PATENT DOCUMENTS 7,863,836 B2   1/2011  Mednik et al.
8,058,812 B2  11/2011  Negrete
(Continued)

FOREIGN PATENT DOCUMENTS

KR  10-2001-0087243 A   9/2001
KR  10-2006-0042204 A   5/2006
KR  10-2013-0121885 A  11/2013
(Continued)

*Primary Examiner* — Harry Behm
*Assistant Examiner* — Peter Novak
(74) *Attorney, Agent, or Firm* — Fenwick & West LLP

(57) ABSTRACT

A signal control circuit and a switching apparatus are provided. The switching apparatus includes: a switch for controlling a current flowing through an inductive element; a monitoring node connected with the switch; and a signal control circuit, connected with the monitoring node and a reference voltage, for turning on/off the switch, wherein the signal control circuit includes an integrator for generating a comparison voltage by using a monitoring voltage of the monitoring node and the reference voltage, wherein the integrator includes: a resistor unit; a capacitor unit; and an auto-calibrator for receiving at least one selection signal and determining at least one of a resistance of the resistor unit and a capacitance of the capacitor unit, during a power-up period, and allowing a peak value of the comparison voltage to fall within a target range.

14 Claims, 13 Drawing Sheets

(56) References Cited

U.S. PATENT DOCUMENTS

2010/0259192 A1* 10/2010 Negrete ................ H02M 3/156
                                                      315/297
2014/0266120 A1*  9/2014 Isham .................. H02M 3/158
                                                      323/283

FOREIGN PATENT DOCUMENTS

KR    10-2013-0126651 A    11/2013
KR    10-2014-0001565 A     1/2014

* cited by examiner

SIGNAL CONTROL CIRCUIT AND SWITCHING APPARATUS FOR INCREASED CURRENT CONTROL

CROSS-REFERENCE TO RELATED APPLICATIONS

This application claims priority from and the benefit under 35 U.S.C. §119(a) of Korean Patent Application No. 10-2014-0061009, filed on May 21, 2014, which is hereby incorporated by reference for all purposes as if fully set forth herein.

BACKGROUND

1. Field of Technology

The present disclosure relates to a signal control circuit and a switching apparatus.

2. Description of the Prior Art

The current programmed control of the related art mainly uses a peak current of a switching transistor. Such a peak current control scheme may have a fast transient response and stability, but may cause a switching ripple current of an inductor to reduce the accuracy of a current control loop. Accordingly, the peak current control has a limit in sensing an accurate average current, and needs to sense all current flowing through the inductor in order to sense the accurate average current. Reference is made to U.S. Pat. No. 7,863,836.

SUMMARY

A technical problem to be solved in the present disclosure is to provide a switching apparatus for increasing the accuracy of current programmed control.

Another technical problem to be solved in the present disclosure is to provide a signal control circuit for increasing the accuracy of current programmed control.

Technical problems to be solved in the present disclosure are not limited to the above-mentioned technical problems, and other unmentioned technical problems may be clearly understood by those skilled in the art from the following descriptions.

In order to solve the above-mentioned technical problems, in accordance with an aspect of the present disclosure, there is provided a switching apparatus which includes: a switch for controlling a current flowing through an inductive element; a monitoring node connected with the switch; and a signal control circuit, connected with the monitoring node and a reference voltage, for turning on/off the switch, wherein the signal control circuit includes: an integrator for generating a comparison voltage by integrating a difference between a monitoring voltage of the monitoring node and a first reference voltage; and a comparator for generating a reset signal by comparing the comparison voltage with a second reference voltage, wherein the signal control circuit turns off the switch by using the reset signal.

The integrator may include: a resistor unit; and a capacitor unit, and the signal control circuit may include an auto-calibrator for adjusting at least one of a resistance of the resistor unit and a capacitance of the capacitor unit and allowing a peak value of the comparison voltage to fall within a target range.

The resistor unit may include n number of resistors, wherein n is a natural number greater than or equal to 1; the capacitor unit may include m number of capacitors, wherein m is a natural number greater than or equal to 1; and the auto-calibrator may select at least one of the n number of resistors and may adjust the resistance of the resistor unit, and may select at least one of the m number of capacitors and may adjust the capacitance of the capacitor unit.

The auto-calibrator may include a first switching unit and a second switching unit that receive selection signals, the n number of resistors may be connected in parallel by the first switching unit, and the m number of capacitors may be connected in parallel by the second switching unit.

The target range may include a range between a first voltage and a second voltage, wherein the first voltage may be less than a power source voltage applied to the integrator, and the second voltage may be greater than the first reference voltage.

The comparator may compare the comparison voltage with the second reference voltage and may generate a reset signal when the comparison voltage becomes equal to the second reference voltage.

The auto-calibrator may differently adjust the resistance of the resistor unit or the capacitance of the capacitor unit according to a selection signal different for each calibration period, and may maintain a selection signal of a calibration period, during which the peak value of the comparison voltage falls within the target range, and may determine the resistance of the resistor unit and the capacitance of the capacitor unit.

A first RC value of the integrator, which is determined by the auto-calibrator during the first calibration period, may be different from a second RC value of the integrator which is determined during the second calibration period.

In order to solve the above-mentioned technical problems, in accordance with another aspect of the present disclosure, there is provided a signal control circuit which includes: an integrator for receiving a monitoring voltage of a monitoring node connected with a switch and a first reference voltage, integrating a difference between the monitoring voltage and the first reference voltage, and generating a comparison voltage; and a comparator for receiving the comparison voltage and a second reference voltage, comparing the comparison voltage with the second reference voltage, and generating a reset signal, wherein the signal control circuit turns on/off the switch by using the reset signal.

The integrator may include an auto-calibrator for adjusting a RC value of the integrator and allowing a peak value of the comparison voltage to fall within a target range.

The auto-calibrator may include: a resistor unit including at least one resistor; and a capacitor unit including multiple capacitors, wherein the auto-calibrator may select at least one of the multiple capacitors and may adjust a capacitance of the capacitor unit.

Other details of the present disclosure are included in the detailed description and the drawings.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
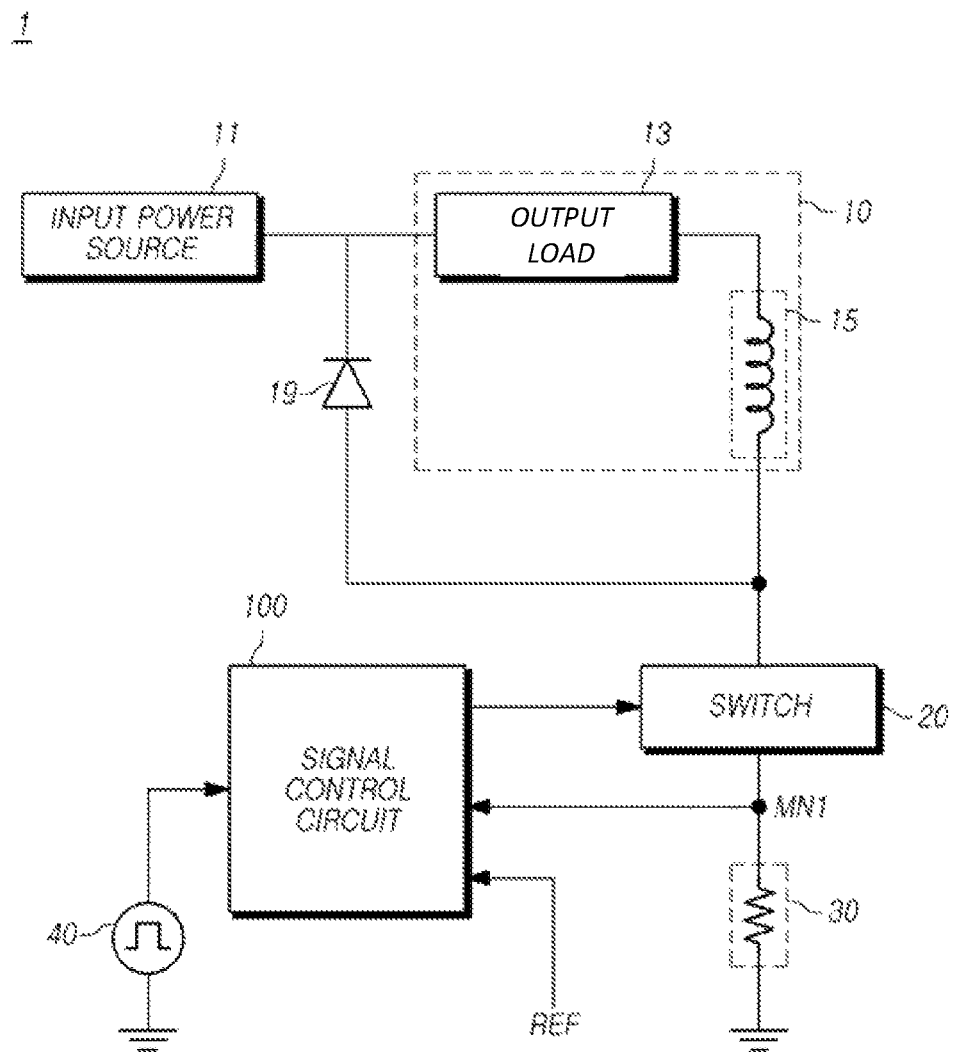
FIG. 1 is a block diagram illustrating a configuration of a switching apparatus according to embodiments of the present disclosure.

The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present invention and inform those skilled in the art of the scope of the present disclosure, and the present invention is defined only by the scope of the appended claims. Throughout the specification, the same or like reference numerals designate the same or like elements.

When an element is referred to as being "connected to" or "coupled to" any other element, not only the element may be directly connected or coupled to the other element, but also another new element may be interposed between them. Contrarily, when an element is referred to as being "directly connected to" or "directly coupled to" any other element, it should be understood that there is no new element between the element and the other element. Throughout the specification, the same or like reference numerals designate the same or like elements. The expression "and/or" includes any or all combinations of items enumerated together.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Unless defined otherwise, all terms as used herein (including technical terms and scientific terms) have the same meaning as commonly understood by a person of ordinary skill in the art to which the present invention pertains. Such terms as those defined in a generally used dictionary are not to be interpreted to have ideal or excessively meanings unless clearly defined in the present invention.

Figure 2:
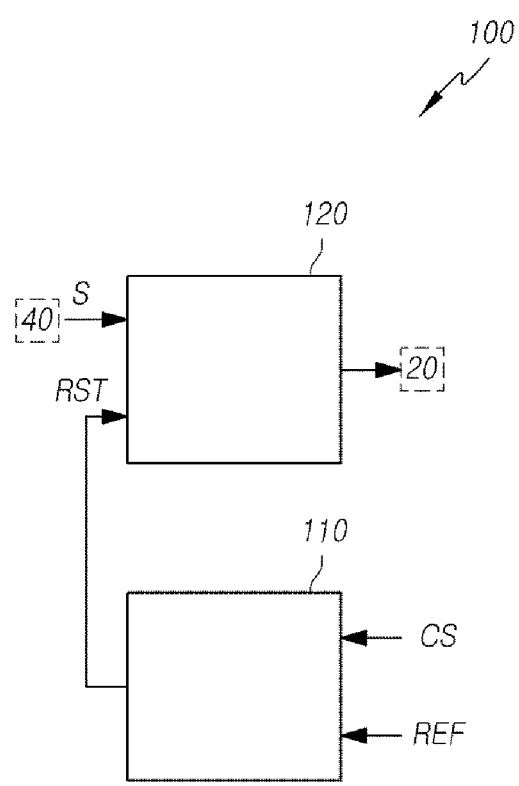
FIG. 2 is a block diagram of an example of a signal control circuit illustrated in FIG. 1 according to one embodiment.
Figure 3:
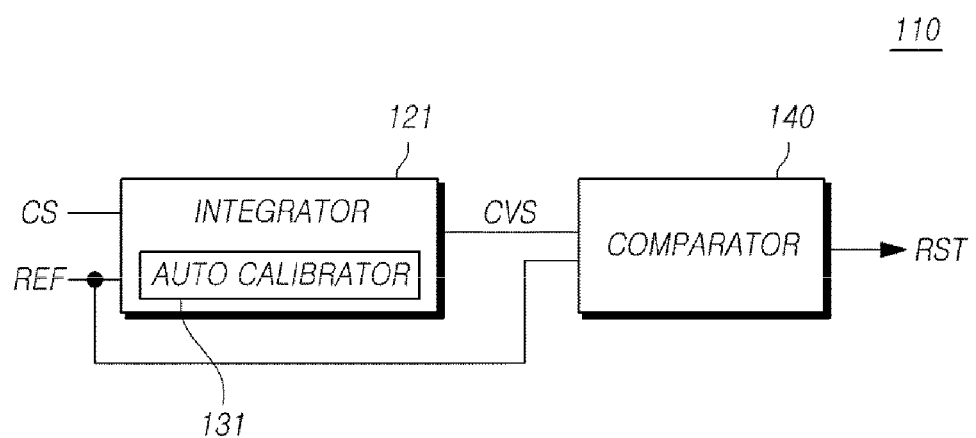
FIG. 3 is a block diagram of an example of a reset signal generator illustrated in FIG. 2 according to one embodiment.

FIG. 1 is a block diagram illustrating a configuration of a switching apparatus according to embodiments of the present disclosure. FIG. 2 is a block diagram of an example of a signal control circuit illustrated in FIG. 1 according to one embodiment, and FIG. 3 is a block diagram of an example of a reset signal generator illustrated in FIG. 2 according to one embodiment.

First, referring to FIG. 1, the switching apparatus 1, according to embodiments of the present disclosure, may include a switch 20, a monitoring node MN1, a signal control circuit 100, a catch diode 19, and the like.

The switching apparatus 1 is electrically connected to an application circuit unit 10. The switching apparatus 1 may control a current flowing through an inductive element 15 included in the application circuit unit 10. Here, the application circuit unit 10 may be implemented by any circuit including the inductive element 15, and may be, for example, a buck converter, a light device, a power transformer, and the like. The application circuit unit 10 may include, for example, an output load 13 connected with an input power source 11, the inductive element 15 connected with the output load 13, and the like. The output load 13 may be, for example, a resistor, a Light-Emitting Diode (LED), and the like. One terminal of the inductive element 15 may be connected to the output load 13 and the other terminal thereof may be connected to the switch 20.

One terminal of the catch diode 19 may be connected to the switch 20, and the other terminal of the catch diode 19 may be connected between the input power source 11 and the output load 13. The catch diode 19 may also be referred to as "flyback diode," "freewheeling diode," "snubber diode," "suppressor diode," "clamp diode," and the like. Specifically, the catch diode 19 generates a continuous loop so as to enable a current flowing through the inductive element 15 to be extinguished even when the switch 20 is turned off. In other words, after the switch 20 is turned off, the current is extinguished while the current continuously flows through the catch diode 19, the output load 13, and the inductive element 15.

The monitoring node MN1 may be located between the switch 20 and a monitoring element 30. The monitoring element 30 may be a resistor arranged between a ground voltage and the switch 20.

The signal control circuit 100 is connected to the monitoring node MN1 and a reference voltage REF, and turns the switch 20 on and off.

As illustrated in FIG. 2, the signal control circuit 100 may include a reset signal generator 110 and a set-reset (SR) latch 120. The SR latch 120 receives a set signal S provided by an oscillator 40 shown in FIG. 1, and receives a reset signal RST provided by the reset signal generator 110.

The SR latch 120 receives the set signal S in the form of periodic pulses at a predetermined frequency from the oscillator 40, and periodically turns on the switch 20.

Also, the reset signal generator 110 generates the reset signal RST by using a monitoring voltage CS and the reference voltage REF.

Here, the monitoring voltage CS refers to a voltage of the monitoring node MN1. When the switch 20 is turned on, the monitoring voltage CS may gradually change (e.g., increase) with the lapse of time.

The reference voltage REF may be greater than a level (hereinafter referred to as a "start level") of the monitoring voltage CS in a case where the switch 20 is turned on, and may be less than a level (hereinafter referred to as a "final level") of the monitoring voltage CS in a case where the switch 20 is turned off. For example, the reference voltage REF may be an average value (refer to FIG. 5) of a start level VL and a final level VH of the monitoring voltage CS.

A comparison voltage CVS refers to a voltage which is generated by an integrator 121 (shown in FIG. 3) when the switch 20 is turned on. The comparison voltage CVS may be generated by using the reference voltage REF and the monitoring voltage CS.

Specifically, when the switch 20 is turned on, a current provided by the input power source 11 passes through the output load 13, the inductive element 15, and the monitoring element 30, and is drained to ground, as the ground voltage. The switch 20 may control such that a current flowing through the inductive element 15 shifts upwards or downwards with the reference voltage REF as a center while the switch 20 is periodically turned on/off at a predetermined frequency. In such a scheme, the switch 20 adjusts an average current flowing through the output load 13 and the inductive element 15.

Referring to FIG. 3, the reset signal generator 110 may include the integrator 121 and a comparator 140 according to one embodiment. Specifically, the integrator 121 may receive the monitoring voltage CS and the reference voltage REF, and may generate a comparison voltage CVS by using the monitoring voltage CS and the reference voltage REF.

The comparator 140 is connected with the integrator 121, and generates a reset signal RST by comparing the comparison voltage CVS with the reference voltage REF. When the comparison voltage CVS is equal to the reference voltage REF, the comparator 140 generates the reset signal RST.

The integrator 121 may include an auto-calibrator 131. The auto-calibrator 131 may adjust a resistor-capacitor (RC) value of the integrator 121, and may adjust a waveform of the comparison voltage CVS. An operation of the auto-calibrator 131 will be described below.

Figure 4:
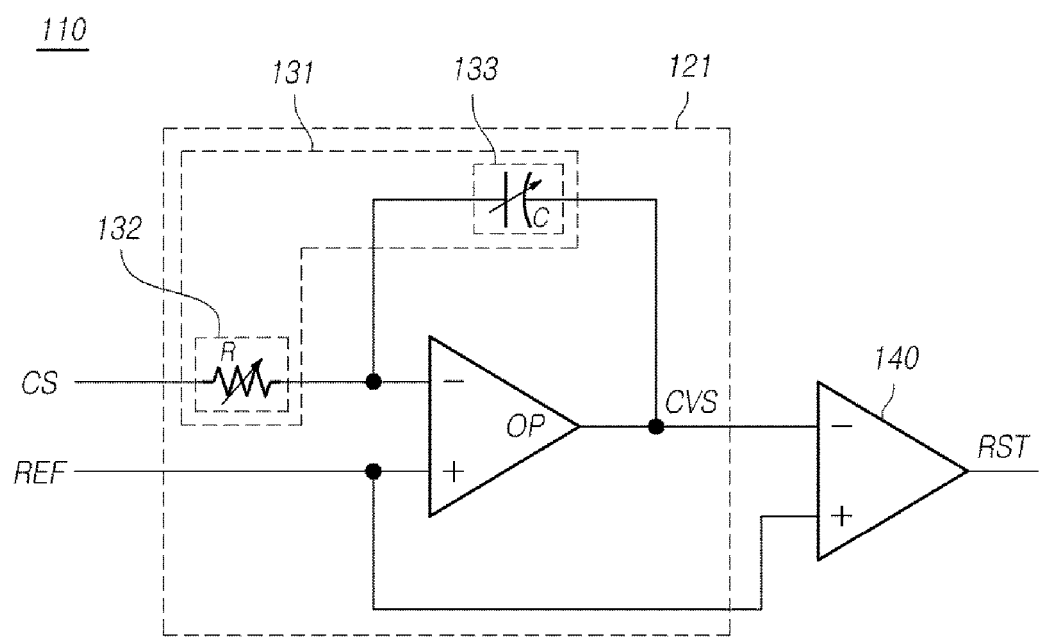
FIG. 4 is a circuit diagram of an example of the reset signal generator illustrated in FIG. 3 according to one embodiment.
Figure 5:
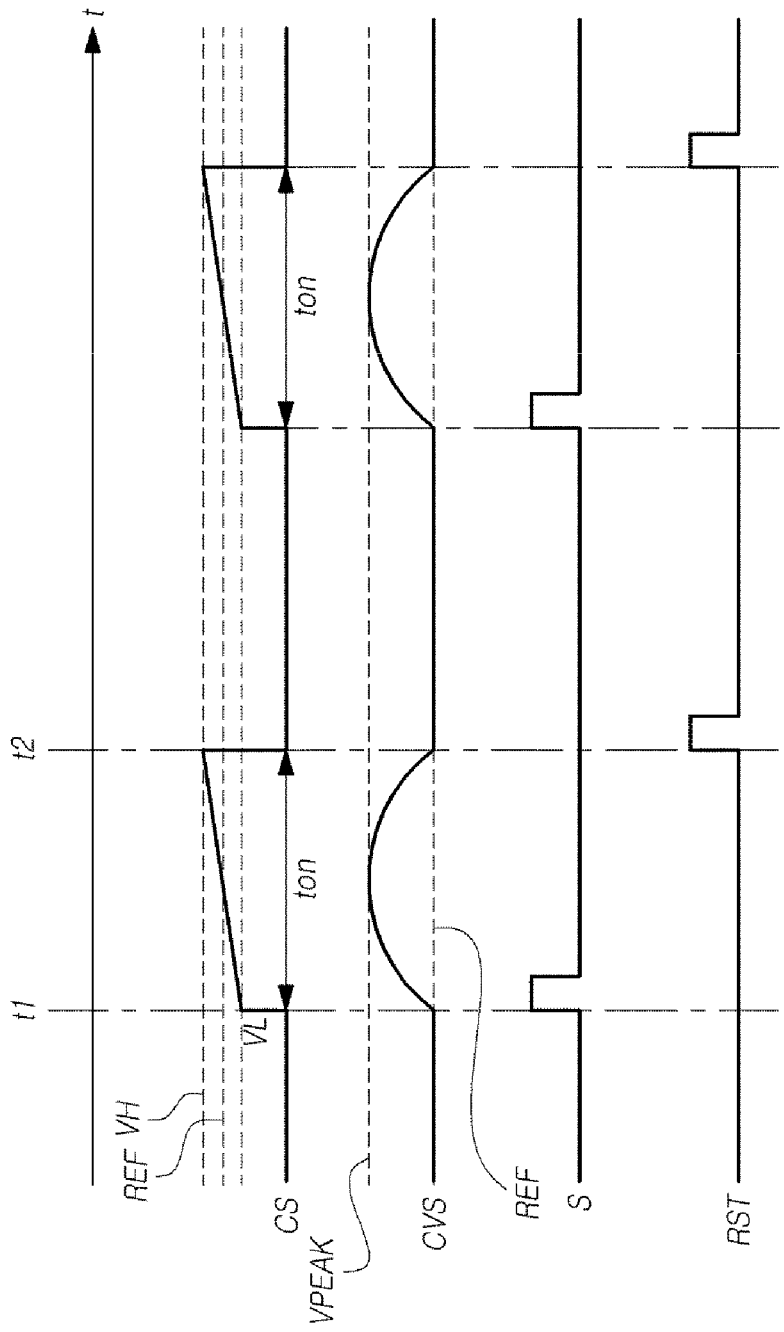
FIG. 5 is a timing diagram of the circuit diagram illustrated in FIG. 4.
Figure 6:
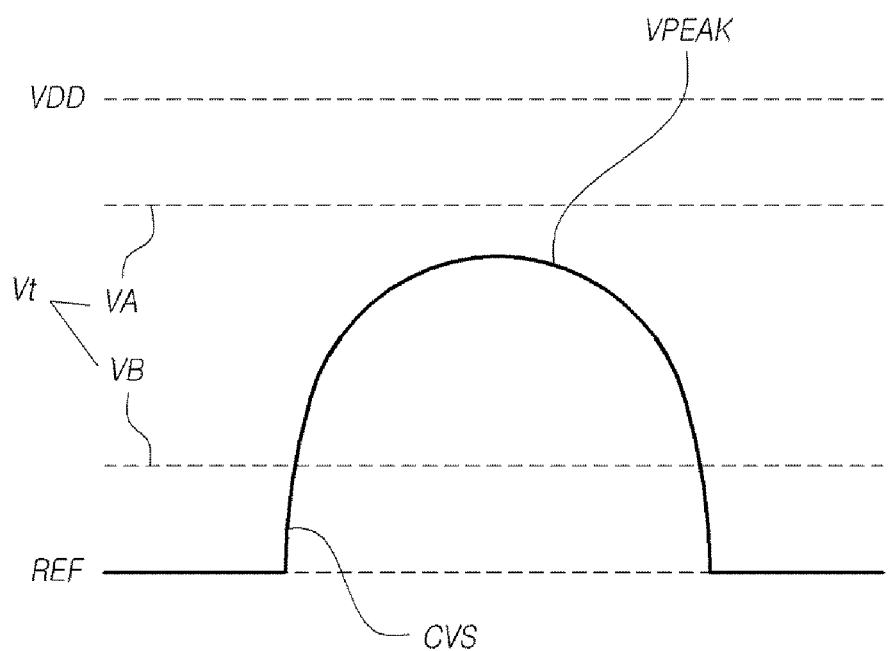
FIG. 6 is a timing diagram illustrating in detail a waveform of a comparison voltage illustrated in FIG. 5.

FIG. 4 is a circuit diagram of an example of the reset signal generator 110 illustrated in FIG. 3 according to one embodiment. FIG. 5 is a timing diagram of the circuit diagram illustrated in FIG. 4. FIG. 6 is a timing diagram illustrating in detail a waveform of a comparison voltage CVS illustrated in FIG. 5.

First, referring to FIG. 4, when the switch 20 is turned on, the integrator 121 generates the comparison voltage CVS by integrating the monitoring voltage CS and the reference voltage REF. The integrator 121 includes a resistor unit 132, a capacitor unit 133, and an amplifier OP. The reference voltage REF is provided to a non-inverting terminal (+) of the amplifier OP, and the monitoring voltage CS is applied to an inverting terminal (−) of the amplifier OP through the resistor unit 132.

The auto-calibrator 131 includes the resistor unit 132 and the capacitor unit 133, and adjusts a resistance R of the resistor unit 132 and a capacitance C of the capacitor unit 133.

The comparator 140 compares a comparison voltage CVS, which is output from an output terminal of the amplifier OP, with the reference voltage REF. When the comparison voltage CVS becomes equal to the reference voltage REF, the comparator 140 generates a reset signal RST.

Referring to FIG. 1 and FIGS. 4 and 5, a set signal S having a pulse shape is generated at time t1. The switch 20 is turned on based on the generated set signal. At time t1, the monitoring voltage CS has a start level VL. At time t2 when the switch 20 is turned off, the monitoring voltage CS has a final level VH. The monitoring voltage CS gradually increases from the start level VL to the final level VH during a period from time t1 to time t2.

The integrator 121 generates a comparison voltage CVS from time t1. The comparison voltage CVS is generated by integrating the monitoring voltage CS and the reference voltage REF.

Referring to FIG. 6, the waveform of the comparison voltage CVS will be described in detail. The comparison voltage CVS may have a value calculated by Equation (1) below.

$$CVS = -\frac{1}{RC}\int (CS - REF)dt + REF$$

$$= -\frac{1}{RC}\left[(VL - REF)t + \frac{1}{2}\frac{VH - VL}{t_{on}}t^2\right]$$

$$= -\frac{1}{RC}\left[(VL - REF)t + \frac{REF - VL}{t_{on}}t^2\right]$$

Equation (1)

As defined by Equation (1), the comparison voltage CVS is generated by integrating the reference voltage REF and the monitoring voltage CS, and thus starts from the reference voltage REF. For example, the comparison voltage CVS gradually increases and has a peak voltage Vpeak when the monitoring voltage CS becomes equal to the reference voltage REF. The comparison voltage CVS is gradually reduced, and becomes equal to the reference voltage REF, at time t2.

A level and waveform of the peak voltage Vpeak may be determined by the RC value (i.e., the resistance R of the resistor unit 132 and the capacitance C of the capacitor unit 133) in Equation (1), and the auto-calibrator 131 may adjust the RC value of the integrator 121.

The comparison voltage CVS may have a value between the reference voltage REF and a power source voltage (i.e., a power source voltage VDD applied to the amplifier OP) applied to the integrator 121. However, for a stable operation, the peak voltage Vpeak of the comparison voltage CVS falls within a target range Vt.

The target range Vt may refer to a range between a first voltage VA and a second voltage VB. The first voltage VA is less than the power source voltage VDD, and is greater than the second voltage VB. The second voltage VB is greater than the reference voltage REF, and is less than the first voltage VA. The target range Vt may be optionally determined by adjusting the first voltage VA and the second voltage VB.

At time t2, when the comparison voltage CVS becomes equal to the reference voltage REF, a reset signal RST is generated. Accordingly, the switch 20 is turned off.

The comparator 140 receives the reference voltage REF through one input terminal (+) thereof, and receives the comparison voltage CVS through the other input terminal (−) thereof. When the comparison voltage CVS becomes equal to the reference voltage REF, the comparator 140 outputs a reset signal RST.

Referring to FIGS. 3 and 4, an identical reference voltage REF may be applied to both the amplifier (i.e., the operational amplifier) OP and the comparator 140 within the integrator 121. In this case, at a time point when the comparison voltage CVS which is an output from the integrator 121 becomes equal to the reference voltage REF, a reset signal RST is output and the switch 20 is turned off.

A reference voltage (e.g., Vq), which is different from a reference voltage REF applied to the amplifier OP within the integrator 121, may be applied to the comparator 140. It is desirable that the reference voltage REF and the different reference voltage Vq are clean direct current (DC) voltages.

Meanwhile, according to this embodiment and other embodiments of the present disclosure, the reference voltage REF may be applied to the amplifier OP within the integrator 121, and the monitoring voltage CS may be applied to the comparator 140. In this case, at a time point when a comparison voltage CVS which is an output from the integrator 121 becomes equal to the monitoring voltage CS, a reset signal RST is output and the switch 20 is turned off. Then, when the integrator 121 operates in the next cycle, the value of an output at a time point when the switch 20 has been turned off in the previous cycle has been stored in a capacitor connected with the integrator 121, and the stored voltage is compared with the monitoring voltage CS. At this time, the comparison voltage CVS which is an output from the integrator 121 starts from the voltage stored in the capacitor and gradually increases. Therefore, the comparison voltage CVS becomes greater than a comparison voltage CVS in the configuration illustrated in FIG. 3 and FIG. 4, and thus it may take more time to cause the comparison voltage CVS to fall within the target range Vt.

Therefore, an embodiment in a case where an identical reference voltage REF is applied to both the amplifier OP and the comparator 140 within the integrator 121 is more desirable in the design of a low-voltage operating circuit than that of a case where a monitoring voltage CS is applied to the comparator 140 according to another embodiment of the present disclosure.

Also, with respect to the monitoring voltage CS, an undesirable peak voltage may be generated by parasitic components (e.g., a combination of parasitic capacitors or parasitic resistors) of the switch 20 and a line connected to the switch 20 when the switch 20 is turned on or off. Since a clean DC voltage is used when the identical reference voltage RFE is applied to both the amplifier OP and the comparator 140 within the integrator 121, the former case is more stable in operation than the latter case.

Figure 7:
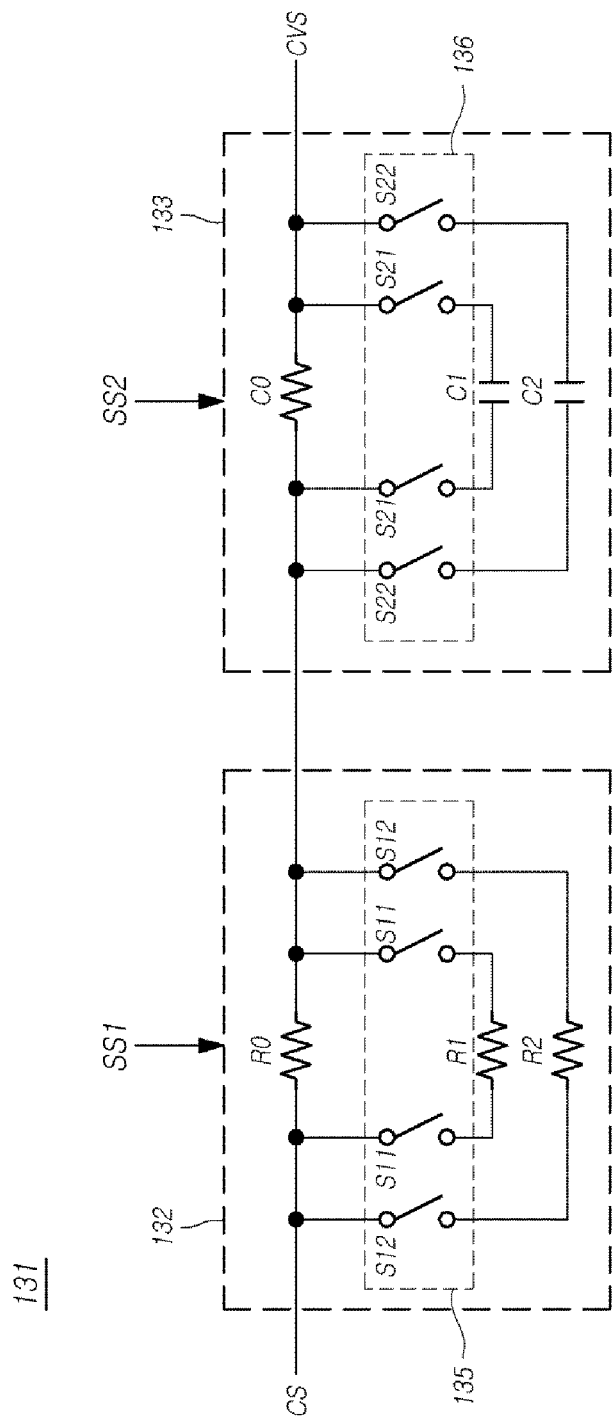
FIG. 7 is a circuit diagram of an example of an auto-calibrator according to one embodiment.
Figure 8:
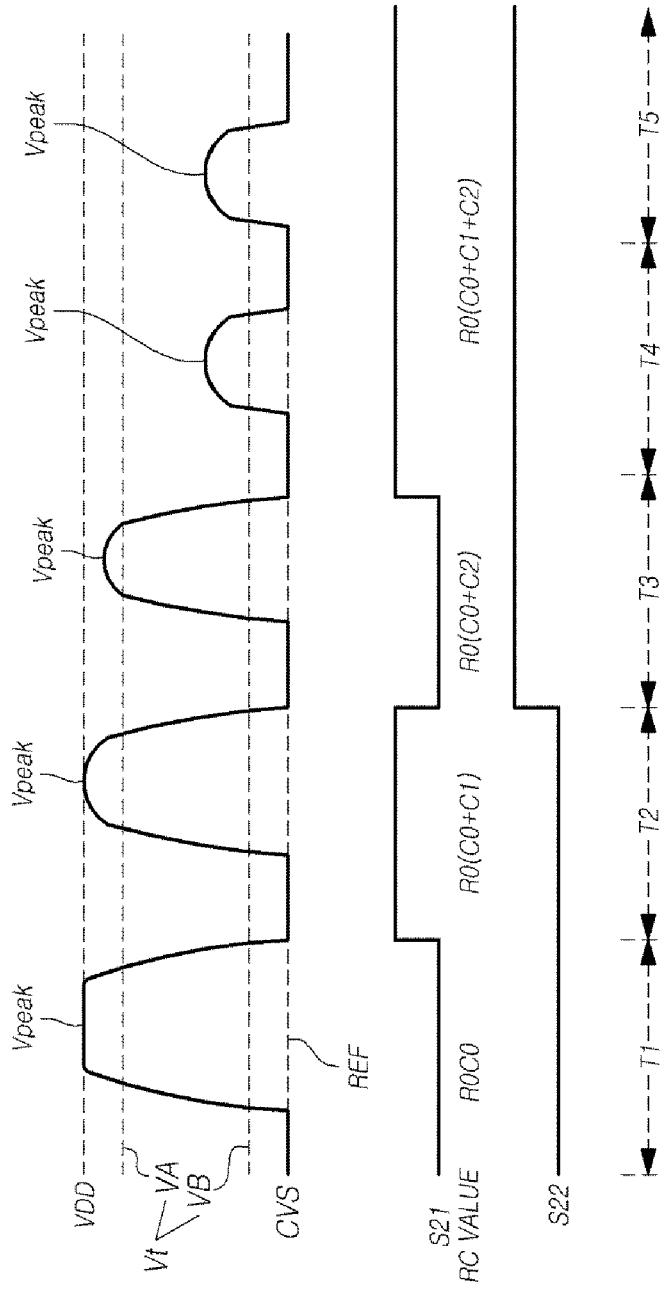
FIGS. 8 and 9 are timing diagrams for explaining an operating method of an auto-calibrator.
Figure 9:
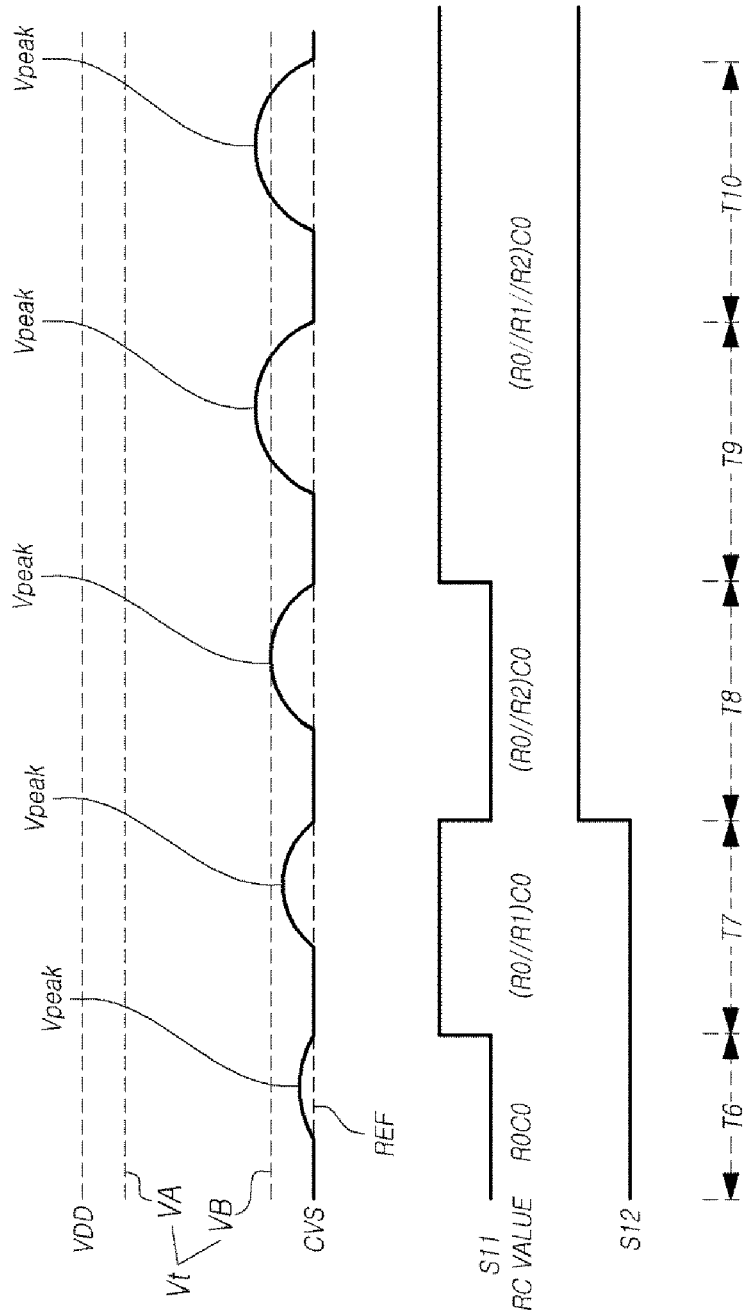

Referring to FIGS. 7 to 9, the auto-calibrator 131 will be described. FIG. 7 is a circuit diagram of an example of the auto-calibrator 131 according to one embodiment. FIGS. 8 and 9 are timing diagrams for explaining an operating method of the auto-calibrator 131.

The auto-calibrator 131 adjusts the RC value of the integrator 121. The auto-calibrator 131 adjusts at least one of the resistance R of the resistor unit 132 of the integrator 121 and the capacitance C of the capacitor unit 133 of the integrator 121, and thereby allows the peak voltage Vpeak of the comparison voltage CVS to fall within the target range Vt.

The resistor unit 132 may include a first resistor R0, a second resistor R1, and a third resistor R2. The first resistor R0, the second resistor R1, and the third resistor R2 may be connected in parallel by a first switching unit 135.

The capacitor unit 133 may include a first capacitor C0, a second capacitor C1, and a third capacitor C2. The first capacitor C0, the second capacitor C1, and the third capacitor C2 may be connected in parallel by a second switching unit 136.

The auto-calibrator 131 may receive a selection signal, and may adjust the resistance of the resistor unit 132 and the capacitance of the capacitor unit 133. The selection signal includes a first selection signal SS1, which adjusts the resistance of the resistor unit 132, and a second selection signal SS2 which adjusts the capacitance of the capacitor unit 133. The first selection signal SS1 is provided to the first switching unit 135 connected to the resistor unit 132, and the second selection signal SS2 is provided to the second switching unit 136 connected to the capacitor unit 133.

In FIG. 7, the number of resistors included in the resistor unit 132 and the number of capacitors included in the capacitor unit 133 are illustrated as being both equal to 3. However, embodiments of the present disclosure are not limited thereto. Accordingly, the number of resistors included in the resistor unit 132 may be different from that of capacitors included in the capacitor unit 133.

The auto-calibrator 131 may differently adjust the resistance of the resistor unit 132 or the capacitance of the capacitor unit 133, according to a selection signal different for each calibration period, may maintain a selection signal of a calibration period during which a peak value of a comparison voltage falls within a target range, and may determine the resistance of the resistor unit 132 and the capacitance of the capacitor unit 133. Referring to FIG. 8, a peak voltage Vpeak of a comparison voltage CVS is measured during a first calibration period T1. For example, during the first calibration period T1, the auto-calibrator 131 may open all of a first switch S11, a second switch S12, a third switch S21, and a fourth switch S22 shown in FIG. 7. Accordingly, the RC value of the integrator 121 is equal to a value obtained by multiplying the resistance of the first resistor R0 by the capacitance of the first capacitor C0.

When, during the first calibration period T1, the peak voltage Vpeak of the comparison voltage CVS does not fall within the target range Vt and is greater than the first voltage VA, the second selection signal SS2 may close the third switch S21. Accordingly, the capacitance C of the capacitor unit 133 is changed to C0+C1. When the peak voltage Vpeak of the comparison voltage CVS falls within the target range Vt during the first calibration period T1, the second selection signal SS2 is maintained, and the capacitance C of the capacitor unit 133 is determined as C0.

Then, during the second calibration period T2, the peak voltage Vpeak of the comparison voltage CVS is measured. At this time, the RC value of the integrator 121 is equal to R0×(C0+C1). When, during the second calibration period T2, the peak voltage Vpeak of the comparison voltage CVS does not fall within the target range Vt and is greater than the first voltage VA, the second selection signal SS2 may open the third switch S21, and may close the fourth switch S22. Accordingly, the capacitance C of the capacitor unit 133 is changed to C0+C2. When the peak voltage Vpeak of the comparison voltage CVS falls within the target range Vt during the second calibration period T2, the second selection signal SS2 is maintained, and the capacitance C of the capacitor unit 133 is determined as C0+C1.

Next, during a third calibration period T3, the peak voltage Vpeak of the comparison voltage CVS is measured. At this time, the RC value of the integrator 121 is equal to R0×(C0+C2). When, during the third calibration period T3, the peak voltage Vpeak of the comparison voltage CVS does not fall within the target range Vt and is greater than the first voltage VA, the second selection signal SS2 may close the third switch S21, and may close the fourth switch S22. Accordingly, the capacitance C of the capacitor unit 133 is changed to C0+C1+C2. When the peak voltage Vpeak of the comparison voltage CVS falls within the target range Vt during the third calibration period T3, the second selection signal SS2 is maintained, and the capacitance C of the capacitor unit 133 is determined as C0+C2.

Then, during a fourth calibration period T4, the peak voltage Vpeak of the comparison voltage CVS is measured. At this time, the RC value of the integrator 121 is equal to R0×(C0+C1+C2). When the peak voltage Vpeak of the comparison voltage CVS falls within the target range Vt during the fourth calibration period T4, the second selection signal SS2 is maintained, and the capacitance C of the capacitor unit 133 is determined as C0+C1+C2. Accordingly, during a period (e.g., a fifth calibration period T5) following the fourth calibration period T4, the capacitance C of the capacitor unit 133 is also equal to C0+C1+C2.

Referring to FIG. 9, during a sixth calibration period T6, the peak voltage Vpeak of the comparison voltage CVS is measured. For example, during the sixth calibration period T6, the auto-calibrator 131 may open all of the first switch S11, the second switch S12, the third switch S21, and the fourth switch S22. Accordingly, the RC value of the integrator 121 is equal to a value obtained by multiplying the resistance of the first resistor R0 by the capacitance of the first capacitor C0.

When, during the sixth calibration period T6, the peak voltage Vpeak of the comparison voltage CVS does not fall within the target range Vt and is less than the second voltage VB, the first selection signal SS1 may close the first switch S11. Accordingly, the resistance R of the resistor unit 132 is changed to the resistance of R0 parallel to R1 (R0∥R1). When the peak voltage Vpeak of the comparison voltage CVS falls within the target range Vt during the sixth calibration period T6, the first selection signal SS1 is maintained, and the resistance R of the resistor unit 132 is determined as R0.

Then, during a seventh calibration period T7, the peak voltage Vpeak of the comparison voltage CVS is measured. At this time, the RC value of the integrator 121 is equal to (R0∥R1)×C0. When, during the seventh calibration period T7, the peak voltage Vpeak of the comparison voltage CVS does not fall within the target range Vt and is less than the second voltage VB, the second selection signal SS2 may open the first switch S11, and may close the second switch S12.

Accordingly, the resistance R of the resistor unit 132 is changed to the resistance of R0 parallel to R2 (R0∥R2). When the peak voltage Vpeak of the comparison voltage CVS falls within the target range Vt during the seventh calibration period T7, the first selection signal SS1 is maintained, and the resistance R of the resistor unit 132 is determined as R0∥R1.

Next, during an eighth calibration period T8, the peak voltage Vpeak of the comparison voltage CVS is measured. At this time, the RC value of the integrator 121 is equal to (R0∥R2)×C0. When, during the eighth calibration period T8, the peak voltage Vpeak of the comparison voltage CVS does not fall within the target range Vt and is less than the second voltage VB, the first selection signal SS1 may close the first switch S11, and may close the second switch S12. Accordingly, the resistance R of the resistor unit 132 is changed to R0∥R1∥R2. When the peak voltage Vpeak of the comparison voltage CVS falls within the target range Vt during the eighth calibration period T8, the first selection signal SS1 is maintained, and the resistance R of the resistor unit 132 is determined as R0∥R2.

Then, during a ninth calibration period T9, the peak voltage Vpeak of the comparison voltage CVS is measured. At this time, the RC value of the integrator 121 is equal to (R0∥R1∥R2)×C0. When the peak voltage Vpeak of the comparison voltage CVS falls within the target range Vt during the ninth calibration period T9, the first selection signal SS1 is maintained, and the resistance R of the resistor unit 132 is determined as R0∥R1∥R2. Accordingly, during a period (e.g., a tenth calibration period T10) following the ninth calibration period T9, the resistance R of the resistor unit 132 is equal to R0∥R1∥R2.

As illustrated in FIGS. 8 and 9, the RC value of the integrator 121 may be adjusted by using the first switching unit 135 and the second switching unit 136, and the peak voltage Vpeak of the comparison voltage CVS may be changed. During the first to fourth calibration periods T1 to T4, the respective RC values of the integrator 121 may be different from each other. During the sixth to ninth calibration periods T6 to T9, the respective RC values of the integrator 121 may be different from each other.

The first to tenth calibration periods T1 to T10, may be a power-up period, namely, a period during which the switching apparatus 1 operates, but is not limited thereto. For example, during the first to tenth calibration periods T1 to T10, the switching apparatus 1 may be in a normal state. Specifically, if the peak voltage Vpeak deviates from the target range Vt even when the switching apparatus 1 is in the normal state, the auto-calibrator 131 may operate.

Meanwhile, the first switching unit 135 and the second switching unit 136 have been described as being separately adjusted with reference to FIGS. 8 and 9. However, embodiments of the present disclosure are not limited thereto. Alternatively, the first switching unit 135 and the second switching unit 136 may be simultaneously adjusted. Specifically, the RC value of the integrator 121 may be changed by simultaneously adjusting the resistor unit 132 and the capacitor unit 133.

Figure 10:
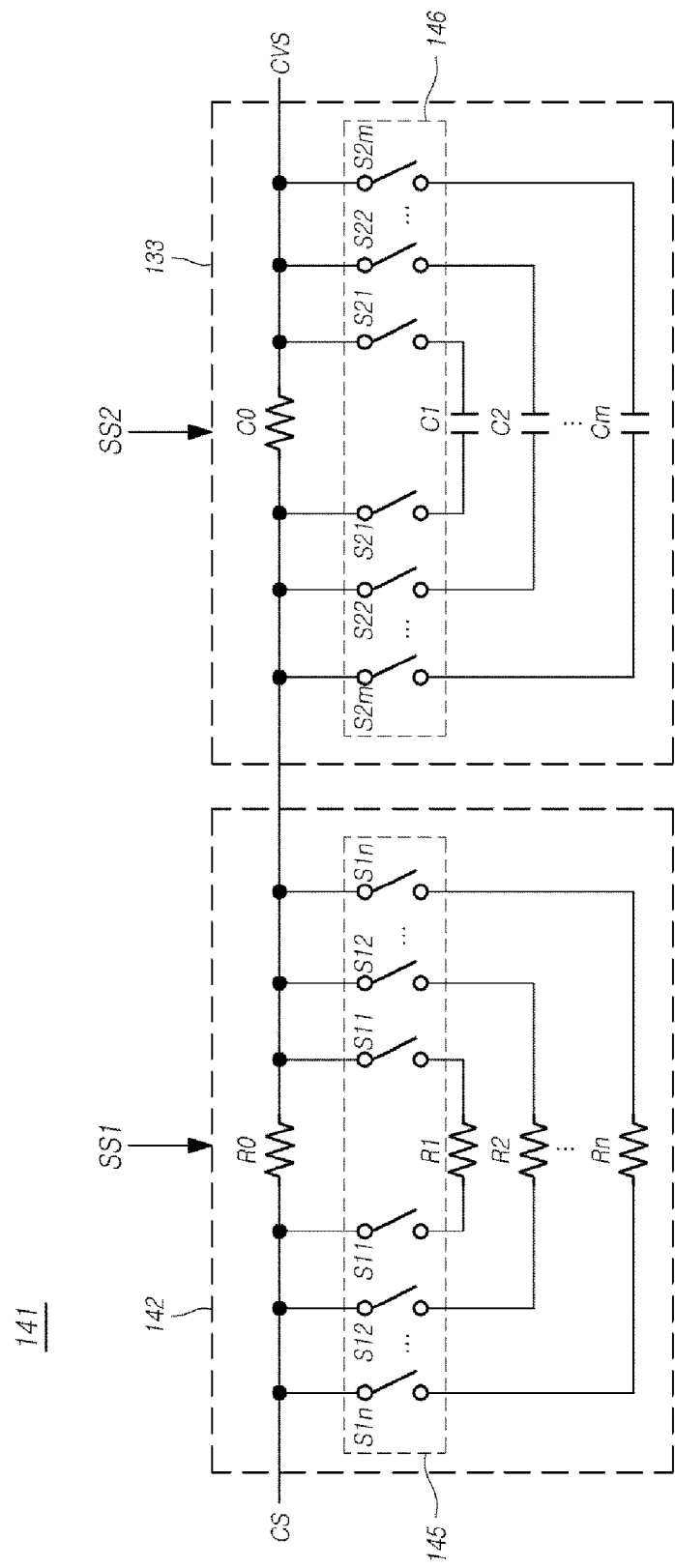
FIG. 10 is a circuit diagram of another example of an auto-calibrator according to one embodiment.

Referring to FIG. 10, an auto-calibrator 141 according to another embodiment of the present disclosure will be described. FIG. 10 is a circuit diagram of another example of the auto-calibrator 141 according to another embodiment.

The auto-calibrator 141 illustrated in FIG. 10 includes multiple resistors R0, R1, R2, . . . , and Rn (n is a natural number greater than or equal to 1), multiple capacitors C0, C1, C2, . . . , and Cm (m is a natural number greater than or equal to 1), a first switching unit 145 that connects the multiple resistors R0, R1, R2, . . . , and Rn in parallel, and a second switching unit 146 that connects the multiple capacitors C0, C1, C2, . . . , and Cm in parallel. The first switching unit 145 may include 2n number of switches, and the second switching unit 146 may include 2m number of switches.

A first selection signal SS1 may adjust the opening or closing of a switch of the first switching unit 145, and a second selection signal SS2 may adjust the opening or closing of a switch of the second switching unit 146.

The auto-calibrator 141 illustrated in FIG. 10 includes various resistors and capacitors, and thus may have more various RC values than the auto-calibrator 131 illustrated in FIG. 7. Therefore, the auto-calibrator 141 may more minutely adjust a peak voltage Vpeak of a comparison voltage CS.

Figure 11:
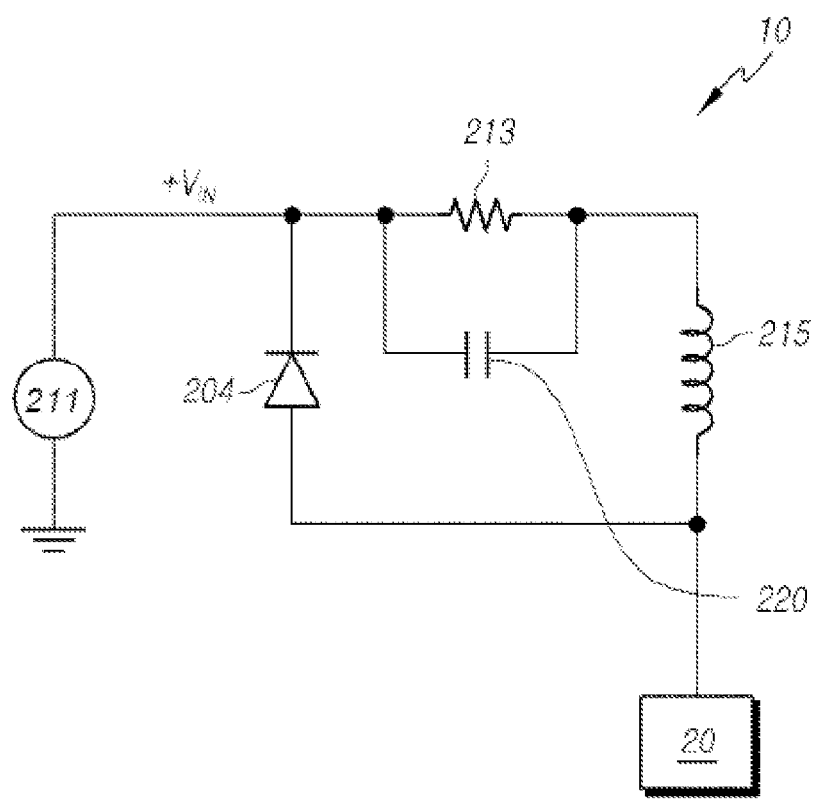
FIGS. 11 to 13 each illustrate examples of an application circuit unit obtained by applying the configuration illustrated in FIG. 1 according to one embodiment.
Figure 12:
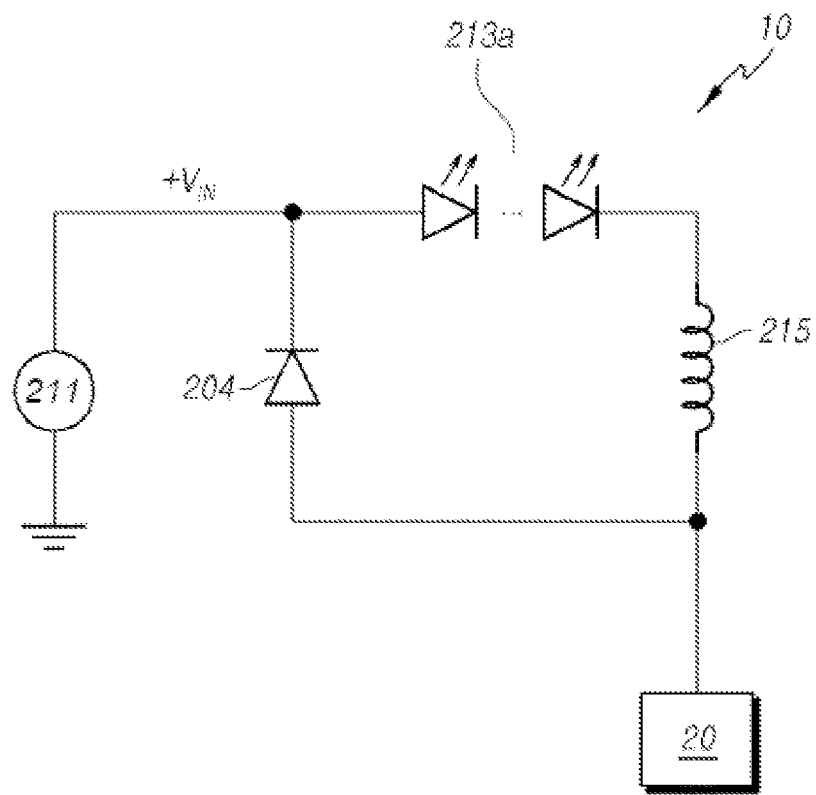
Figure 13:
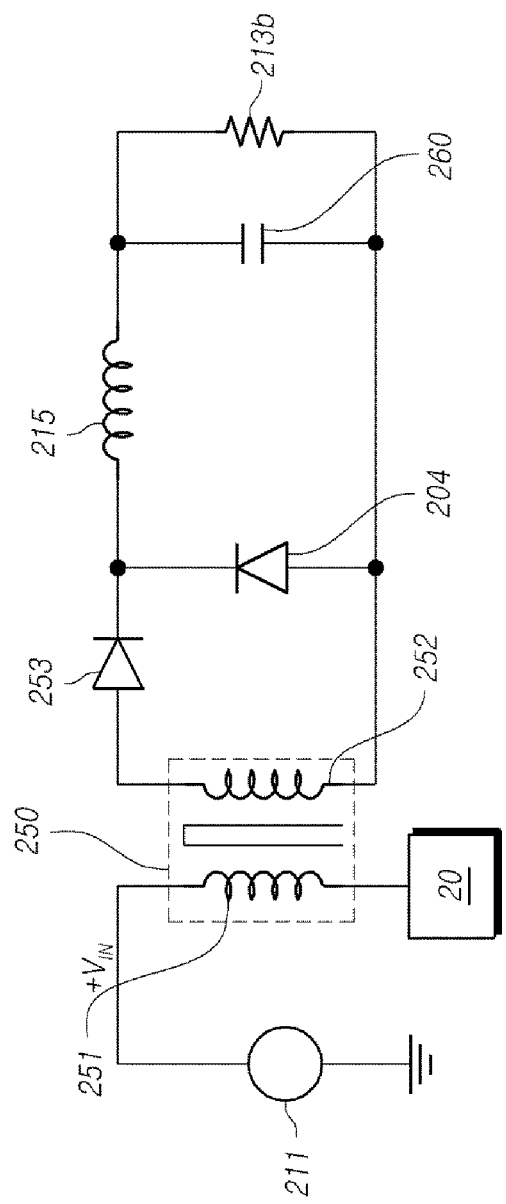

FIGS. 11 to 13 each illustrate examples of an application circuit unit obtained by applying the configuration illustrated in FIG. 1. FIG. 11 illustrates a buck converter, FIG. 12 illustrates a light device, and FIG. 13 illustrates a power transformer.

Referring to FIG. 11, the buck converter includes, for example, an output load 213 in the form of a resistor, and a capacitor 220 connected to both terminals of the output load 213. Also, an inductive element 215 may be connected to one terminal of the output load 213, and a diode 204 may be connected to the other terminal of the output load 213. An input power source 211 is connected to the end of the diode 204 that is connected to the terminal of the output load 213.

Referring to FIG. 12, the light device includes, for example, an output load 213a including multiple LEDs. An inductive element 215 may be connected to one terminal of the output load 213a, and a diode 204 may be connected to the other terminal of the output load 213a. An input power source 211 is connected to the end of the diode 204 that is connected to the terminal of the output load 213a.

Referring to FIG. 13, the power transformer 250 includes a primary winding 251 and a secondary winding 252. An input power source 211 is connected to the primary winding 251. A control diode 253 is connected to the secondary winding 252. An inductive element 215 may be connected to the control diode 253 and an output load 213b in the form of a resistor. An output filter capacitor 260 may be connected to both ends of the output load 213b. One terminal of a catch diode 204 may be connected to a node between the inductive element 215 and the control diode 253, and the other terminal of the catch diode 204 may be connected to a node between the output load 213b and the secondary winding 252.

While the embodiment of the present disclosure has been described with reference to the accompanying drawings, it will be understood by those skilled in the art that the present disclosure may be varied and modified without departing from the technical spirit and the essential feature of the present disclosure. Accordingly, it should be understood that the embodiments described above are merely exemplary and are not limited.

What is claimed is:

1. A switching apparatus comprising:
a switch for controlling a current flowing through an inductive element;
a monitoring node connected with the switch; and
a signal control circuit, connected with the monitoring node, for turning on/off the switch,
wherein the signal control circuit comprises:
an integrator for generating a comparison voltage by integrating a difference between a monitoring voltage of the monitoring node and a first reference voltage; and
a comparator for generating a reset signal by comparing the comparison voltage with a second reference voltage,
wherein the signal control circuit turns off the switch by using the reset signal, and the integrator comprises:
a resistor unit;
a capacitor unit; and
a calibrator for adjusting at least one of a resistance of the resistor unit and a capacitance of the capacitor unit and allowing a peak value of the comparison voltage to fall within a target range, and
wherein the comparator compares the comparison voltage with the second reference voltage and generates a reset signal when the comparison voltage becomes substantially equal to the second reference voltage.

2. The switching apparatus as claimed in claim 1, wherein the resistor unit comprises an n number of resistors, wherein n is a natural number greater than or equal to 1; the capacitor unit comprises an m number of capacitors, wherein m is a natural number greater than or equal to 1; and the calibrator selects at least one of the n number of resistors and adjusts the resistance of the resistor unit, and selects at least one of the m number of capacitors and adjusts the capacitance of the capacitor unit.

3. The switching apparatus as claimed in claim 2, wherein the calibrator comprises a first switching unit and a second switching unit that receive selection signals, the n number of resistors are connected in parallel by the first switching unit, and the m number of capacitors are connected in parallel by the second switching unit.

4. The switching apparatus as claimed in claim 3, wherein the calibrator differently adjusts the resistance of the resistor unit or the capacitance of the capacitor unit according to a selection signal different for each calibration period, and maintains a selection signal of a calibration period, during which the peak value of the comparison voltage falls within the target range, and determines the resistance of the resistor unit and the capacitance of the capacitor unit.

5. The switching apparatus as claimed in claim 1, wherein the target range includes a range between a first voltage and a second voltage, wherein the first voltage is less than a power source voltage applied to the integrator, and the second voltage is greater than the first reference voltage.

6. The switching apparatus as claimed in claim 1, wherein, during a power-up period, the calibrator receives at least one selection signal and adjusts the at least one of the resistance of the resistor unit and the capacitance of the capacitor unit.

7. The switching apparatus as claimed in claim 1, wherein the peak value of the comparison voltage increases as the resistance of the resistor unit becomes smaller, and the peak value of the comparison voltage is reduced as the capacitance of the capacitor unit becomes larger.

8. A switching apparatus comprising:
a switch for controlling a current flowing through an inductive element;
a monitoring node connected with the switch; and
a signal control circuit, connected with the monitoring node, for turning on/off the switch,
wherein the signal control circuit comprises:
an integrator for generating a comparison voltage by integrating a difference between a monitoring voltage of the monitoring node and a first reference voltage; and
a comparator for generating a reset signal by comparing the comparison voltage with a second reference voltage,
wherein the signal control circuit turns off the switch by using the reset signal, and the integrator comprises:
a resistor unit;
a capacitor unit; and
an calibrator for adjusting at least one of a resistance of the resistor unit and a capacitance of the capacitor unit and allowing a peak value of the comparison voltage to fall within a target range, and
wherein the comparison voltage increases when the switch is turned on, has the peak value when the monitoring voltage is equal to the first reference voltage, and is reduced after the comparison voltage reaches the peak value.

9. A signal control circuit comprising:
an integrator for receiving a monitoring voltage of a monitoring node connected with a switch and a first reference voltage, integrating a difference between the monitoring voltage and the first reference voltage, and generating a comparison voltage; and
a comparator for receiving the comparison voltage and a second reference voltage, comparing the comparison voltage with the second reference voltage, and generating a reset signal, wherein the signal control circuit turns off the switch by using the reset signal, and the integrator comprises a calibrator for adjusting an RC value of the integrator and allowing a peak value of the comparison voltage to fall within a target range, wherein the comparator compares the comparison voltage with the second reference voltage and generates the reset signal when the comparison voltage becomes substantially equal to the second reference voltage;

wherein the calibrator comprises:

a resistor unit comprising at least one resistor; and a capacitor unit comprising multiple capacitors, wherein the calibrator selects at least one of the multiple capacitors and adjusts a capacitance of the capacitor unit.

10. The signal control circuit as claimed in claim 9, wherein the resistor unit comprises an n number of resistors, wherein n is a natural number greater than or equal to 1; the capacitor unit comprises an m number of capacitors, wherein m is a natural number greater than or equal to 1; and the calibrator selects at least one of the n number of resistors and adjusts the resistance of the resistor unit, and selects at least one of the m number of capacitors and adjusts the capacitance of the capacitor unit.

11. The signal control circuit as claimed in claim 10, wherein the calibrator comprises a first switching unit and a second switching unit that receive selection signals, the n number of resistors are connected in parallel by the first switching unit, and the m number of capacitors are connected in parallel by the second switching unit.

12. The signal control circuit as claimed in claim 10, wherein the calibrator differently adjusts the resistance of the resistor unit or the capacitance of the capacitor unit according to a selection signal different for each calibration period, and maintains a selection signal of a calibration period, during which the peak value of the comparison voltage falls within the target range, and determines the resistance of the resistor unit and the capacitance of the capacitor unit.

13. The signal control circuit as claimed in claim 10, wherein the peak value of the comparison voltage increases as the resistance of the resistor unit becomes smaller, and the peak value of the comparison voltage is reduced as the capacitance of the capacitor unit becomes larger.

14. A signal control circuit comprising:

an integrator for receiving a monitoring voltage of a monitoring node connected with a switch and a first reference voltage, integrating a difference between the monitoring voltage and the first reference voltage, and generating a comparison voltage; and a comparator for receiving the comparison voltage and a second reference voltage, comparing the comparison voltage with the second reference voltage, and generating a reset signal, wherein the signal control circuit turns off the switch by using the reset signal, and the integrator comprises an calibrator for adjusting an RC value of the integrator and allowing a peak value of the comparison voltage to fall within a target range, and wherein the comparison voltage increases when the switch is turned on, has the peak value when the monitoring voltage is equal to the first reference voltage, and is reduced after the comparison voltage reaches the peak value.

* * * * *

UNITED STATES PATENT AND TRADEMARK OFFICE
CERTIFICATE OF CORRECTION

PATENT NO. : 9,653,993 B2
APPLICATION NO. : 14/717809
DATED : May 16, 2017
INVENTOR(S) : Ok Hwan Kwon et al.

It is certified that error appears in the above-identified patent and that said Letters Patent is hereby corrected as shown below:

On the Title Page

Item (75) Inventors, replace "Ok Hwan Kwon, Daejeon (KR)," with --Ok Hwan Kwon, Yuseong-gu (KR)--.

In the Claims

Column 12 Claim 8, Line 49, replace "an calibrator" with --a calibrator--.
Column 14 Claim 14, Line 24, replace "an calibrator" with --a calibrator--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*